(12) United States Patent
Hwang

(10) Patent No.: US 7,958,362 B2
(45) Date of Patent: Jun. 7, 2011

(54) USER AUTHENTICATION BASED ON ASYMMETRIC CRYPTOGRAPHY UTILIZING RSA WITH PERSONALIZED SECRET

(75) Inventor: Jing-Jang Hwang, Tao-Yuan (TW)

(73) Assignee: Chang Gung University, Tao-Yuan (TW)

(*) Notice: Subject to any disclaimer, the term of this patent is extended or adjusted under 35 U.S.C. 154(b) by 1277 days.

(21) Appl. No.: 11/543,875

(22) Filed: Oct. 6, 2006

(65) Prior Publication Data

US 2007/0081667 A1 Apr. 12, 2007

Related U.S. Application Data

(60) Provisional application No. 60/726,024, filed on Oct. 11, 2005.

(51) Int. Cl.
*H04L 9/32* (2006.01)
*G06F 21/00* (2006.01)
(52) U.S. Cl. .............. 713/176; 713/180; 380/30; 726/6; 726/18
(58) Field of Classification Search .................. None
See application file for complete search history.

(56) References Cited

U.S. PATENT DOCUMENTS

| | | | |
|---|---|---|---|
| 4,996,711 A * | 2/1991 | Chaum | 380/30 |
| 6,976,169 B1 * | 12/2005 | Takagi et al. | 713/180 |
| 7,083,089 B2 * | 8/2006 | Hopkins | 235/382 |
| 7,596,704 B2 * | 9/2009 | Hwang | 713/193 |
| 7,760,873 B2 * | 7/2010 | Gueron et al. | 380/30 |
| 2002/0010858 A1 * | 1/2002 | Moribatake et al. | 713/170 |
| 2006/0059363 A1 * | 3/2006 | Mese et al. | 713/185 |
| 2007/0016785 A1 * | 1/2007 | Guay et al. | 713/176 |
| 2007/0168674 A1 * | 7/2007 | Nonaka et al. | 713/182 |
| 2008/0141035 A1 * | 6/2008 | Furukawa | 713/180 |
| 2009/0276630 A1 * | 11/2009 | Teranishi | 713/176 |

* cited by examiner

*Primary Examiner* — Christopher A Revak
(74) *Attorney, Agent, or Firm* — Rosenberg, Klein & Lee

(57) ABSTRACT

A method for authenticating a user to a computer system is disclosed, comprising using a first input and a second input in producing a digital signature in response to a challenge. The digital signature is valid when the first input matches a personalized secret and the second input matches a trio comprising a public modulus, a public exponent, and a private-key-dependent exponent. Selection of the personalized secret is discretionary and changeable. A crypto-key generation process uses the personalized secret and two primes as input to produce the trio. The public modulus and public exponent of the trio form a public key used in digital signature validation. Also disclosed is a business method that replaces the conventional public-key certificate with an agreement on the user's public key.

4 Claims, 12 Drawing Sheets

Exemplary Agreement on a User Public Key

User's (A) public key, registered on system side (B), includes a public exponent with a length of 17 bits and a public module with a length of 1024 bits and is represented in decimal as the following:

Public Exponent:65537
Public Module:
97499226829491908500824920676831407429175545095559033170959862228858273474161701053138767354909408117793676327753489349539803228366902929518004640699637919749481876511323790892611610141650368668319990769501319498863120189632007409344394388656660539285353780169537767991235672729089514415385818147672529871619

Agreement :
1. The user has the right to deny an invalid digital signature, falsely accepted by the system side, by proving the invalidity of the accepted digital signature with the public key stated on this agreement.
2. The user has the obligation to accept the validity of a valid signature if using the public key on this agreement as a verifier proving the validity.

User (A) Signature :
System Side (B) Signature :

Fig. 7

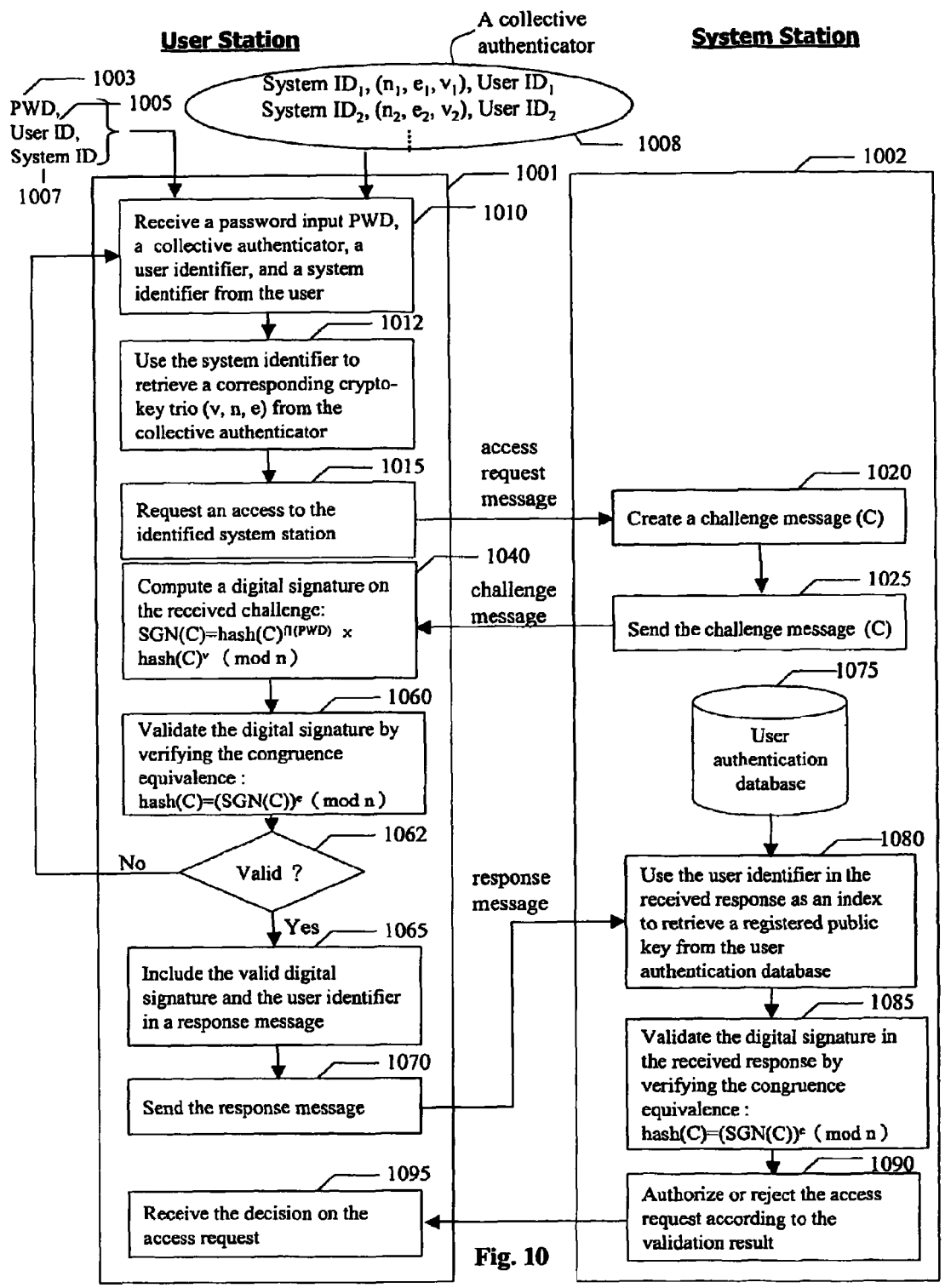

USER AUTHENTICATION BASED ON ASYMMETRIC CRYPTOGRAPHY UTILIZING RSA WITH PERSONALIZED SECRET

This Application claims a Priority Filing Date of Oct. 11, 2005 benefited from a previously filed Provisional Application 60/726,024 entitled "Utilizing RSA with Personalized Secret for User and System Authentication" by a common inventor of this Patent Application.

RELATED US PATENT APPLICATIONS

1. US Patent Application Publication 20060083370 "RSA with personalized secret."
2. US Patent Application Publication 20060036857 "User authentication by linking randomly-generated secret with personalized secret."
3. US Patent Application Publication 20050081041 "Partition and recovery of a verifiable secret."
4. U.S. Provisional Patent Application 60/726024 "Utilizing RSA with personalized secret for user and system authentication", filed on Oct. 11, 2005.

BACKGROUND

1. Technical Field

The present invention relates to user authentication. More specifically, the present invention relates to user authentication in various digital devices, systems and networks.

2. Description of the Prior Art

Cryptosystems use crypto keys for cryptographic computation. In the cryptosystems based on asymmetric cryptography such as RSA (Rivest, Shamir, and Adleman), crypto keys are generated in pairs of a public key and a private key. The way of using the public/private key pair defines two applications. One application uses the private key as a signature key to produce a digital signature on a digital message and the public key as a verification key for verifying whether a value is a valid digital signature. The other application uses the public key as an encryption key to encrypt a plaintext into a cipher and the private key as a decryption key to decrypt the cipher back to the plaintext.

Users who are a signatory performing digital signature must keep their signature private key confidential. Also, users who are a cipher receiver must keep their decryption private key confidential. The private key is a secret. Disclosure of the public key must not reveal the secrecy of the private key, though the private key has a dependence on the public key. Due to this secrecy requirement, computational intractability of deriving the private key from the public key is vital to the security of asymmetric cryptosystems.

In the RSA scheme, computation is carried out with modular arithmetic using the product of two primes as the modulus. The computational intractability of deriving the private key from the pairing public key rests in part on the lack of an efficient algorithm for factoring the product back to the two primes. Nevertheless, the private key is not independent of the public key because of their relationship with the two secret primes. This relationship prohibits the private key from being chosen by a user at the discretion of the user. This relationship also imposes that the private key cannot be replaced except by resorting to a regeneration of the public/private key pair.

The RSA cryptosystem is described in U.S. Pat. No. 4,405,823 and in the paper: Rivest, Shamir, and Adleman, "A Method for Obtaining Digital Signatures and Public-Key Cryptosystems," Communications of the ACM, vol. 21 (1978), pp. 120-126. Several standards have been developed for teaching this asymmetric cryptography, including PKCS #1: RSA Cryptography Standard, November 1993 (v. 1.5) & June 2002 (v. 2.1) and IEEE Std 1363-2000: IEEE Standard Specification for Public-Key Cryptography, which are respectively available at the web site of RSA Laboratories and that of IEEE. These standards include descriptions on key generation, encryption, decryption, signature generation, signature verification, and other related techniques.

RSA computations always involve modular arithmetic. The definition on modular arithmetic is given here. If x and y are integers, then x is said to be congruent to y modulo a positive integer z, written $x \equiv y \pmod{z}$, if z divides (x−y). The positive integer z is called the modulus of the congruence.

The RSA key generation process recommended in PKCS #1 v. 1.5 is summarized below:

(1) A positive integer e is chosen as the public exponent.
(2) Two distinct odd primes p and q are randomly selected such that e is relatively prime to both p−1 and q−1.
(3) The public modulus is the product $n = p \times q$.
(4) The private exponent d is chosen such that both p−1 and q−1 divide $d \times e - 1$.

The RSA public exponent e and modulus n are used to encrypt a plaintext integer m, assumed less than n, to get a cipher integer c by computing $c \equiv m^e \pmod{n}$. The private exponent d and modulus n are used to decrypt the cipher c back to the plaintext m by computing $m \equiv c^d \pmod{n}$.

In certain cryptosystems such as those built accordingly to the SSL/TLS (Secure Sockets Layer/Transport Layer Security) protocols, encryption with RSA is often combined with encryption using symmetric cryptography, creating a hybrid cryptosystem. In such a hybrid cryptosystem, one side of the communication encrypts a randomly generated secret with a RSA public key while the other side receives and decrypts the encrypted secret with a pairing RSA private key; subsequently, both sides use the same secret as a symmetric crypto key for confidential communications. The symmetric crypto key exchanged in this way is called a session key. For details, refer to RFC 2246 and other related documents at the web site of Internet Engineering Task Force.

The RSA private exponent d and modulus n are used to produce a digital signature. First, a digital message M is processed by a selected collision-resistant hash function to produce a digest on M, expressed as hash(M). Next, the digital signature on M, expressed as signature(M), is obtained by computing $\text{signature}(M) \equiv \text{hash}(M)^d \pmod{n}$.

The RSA public exponent e and modulus n are used to validate a value as being a valid digital signature. Suppose that M∥SGN is received by a verifier, where M represents a digital message and SGN represents a value that is attached as a digital signature on M. The verifier first computes hash(M) using the selected collision-resistant hash function, and decrypts SGN with the public key (n, e) by computing $SGN^e \pmod{n}$; next, the verifier compares hash(M) with the decryption result. If the comparison yields an equal, then SGN is a valid digital signature.

Hash functions are used in producing a digital signature. Hash functions are deterministic, meaning that the output is completely determined by the input. The hash function used in digital signature should generally be collision-resistant. This means that it is infeasible to find two distinct inputs that could produce the same output of the hash function. Collision-resistant hash functions also have the desired property of being one-way; this means that given an output, it is infeasible to find an input whose hash is the specified output. In addition, the hash function should be a mask generation function with pseudorandom output: Given one part of the output but not the input, it should be infeasible to predict another part of the output. Six hash functions possessing these properties are suggested for various implementations in PKCS #1 v. 2.1: MD2, MD5, SHA-1, SHA-256, SHA-384, and SHA-512.

Application of asymmetric cryptography raises a concern. How can a public-key's user know that the public key in use is authentic? A cheater may cheat the user into validating a false digital signature as valid with a fictitious public key. Public-key certificates, also known as digital certificates, provide a solution.

Abstractly, a public-key certificate consists of three main components: a public key, an entity's identifier, and a certification authority's digital signature. Thus, a public-key certificate provides a binding between a public key and an identification of an entity and ensures that the public key belongs to the identified entity and that the entity possesses the pairing private key. By validating the certification authority's digital signature, users of the public key prove this binding. A certification authority, abbreviated as CA, is a trusted party who certifies and issues public-key certificates. Revoking certain certificates and publishing the revoked certificates are also part of a CA's duties.

Asymmetric cryptosystems have been around for a long time, but have not been as widely applied as perceived. For example, user login with password where no public/private key pairs are used remains common. One reason is that the infrastructure of ensuring a certificate being valid is cumbersome to build and operate. The task becomes more complicated due to the inflexibility of changing the secret private key. Thus, there exists a need to alleviate the complication.

In certain circumstances, a digital message may need to be signed by several signatories and then verified by one verifier alone. Multisignature techniques were invented to meet the need. See Colin Boyd, "Digital Multisignatures," in Cryptography and Coding (H. J. Becker and F. C. Piper Eds.), Oxford University Press, 1989, pp. 241-246. In U.S. Pat. No. 6,209, 091, two multisignature systems are described: (1) a multiplicative scheme with sequential partial signing, and (2) an additive scheme with asynchronous partial signing. These and other related works result in an advantage. The private key is not needed for the signature computation because the digital signature is computed from a plurality of partial signatures, each of which is computed, respectively, from the digital message and a signature subkey. The private key never exists after the signature subkeys have been derived from it. Therefore, the secrecy of the private key is well protected.

Extended from the multisignature techniques, split-private-key cryptosystems were invented and developed by Ravi Ganesan and others. See U.S. Pat. Nos. 5,535,276, 5,557,678, 5,905,799, etc., where the private exponent key is divided into a first private key portion and a second private key portion. With the two private key portions, asymmetric cryptosystems have at least two benefits. Firstly, dividing the secret into two portions and separately safeguarding each portion strengthens the protection for the secrecy of the private key. Secondly, the user is allowed to use a short secret key while the underlying cryptosystem uses a long but secure private key. The first benefit is conventional wisdom on protecting secrecy. The second benefit is significant, in part because attacks on short RSA secret exponents are feasible as discovered by M. J. Wiener in "Cryptanalysis of Short RSA Secret Exponents, IEEE Trans. on Information Theory, May, 1990, vol. 36, no. 3, pp. 553-558." Recent cryptanalysis on short RSA private exponents includes a technique discovered by Dan Boneh and Glenn Durfee in "Cryptanalysis of RSA with Private Key d Less Than $N^{0.292}$, IEEE Trans. on Information Theory, July, 2000, vol. 46, no. 4, pp. 1339-1349."

The multisignature and split-private-key techniques add values to the RSA theory on the aspects of security and user convenience. The inflexibility of changing the private secret remains unresolved, however. In order to change the private key portions, users may resort to either one of two ways: the first by which the original private key is recovered from the two portions and then divided again and the second by which a new public/private key pair is generated and subsequently the new private key is divided.

However, it is undesirable to recover the original private key because this action contradicts the principle of separating the secrecy and requires special measures to protect the secrecy from disclosure during the recovery process. Regenerating a public/private key pair should also be avoided because such a task is more complicated than generating a first-time public/private key pair due to the added effort of revoking the replaced public-key certificate.

Therefore, there remains a need to improve the split private key techniques on the aspect of changing the private key portions in a more efficient and flexible manner.

Digital signature techniques can be applied to user authentication. Suppose that a user at a user station requests a system station for login. The system station returns a random message as a challenge to the user station. Next, the user station computes a digital signature on the challenge message as a response. The system station grants permission to the user when it validates the response being a valid digital signature. Specification about this process can be found in "ISO/IEC 9798-3: 1998, Information technology—Security techniques—Entity authentication—Part 3: Mechanisms using digital signature techniques."

This login process has one advantage. Disclosure of the public key, which is used by the system station for validating the response, does not reveal the secrecy of the user's private key, provided that the public/private key pair is generated according to the security requirement. The private key is a computer-generated secret and not a secret chosen by a human user. Therefore, the private key is often kept in a physical token like an IC card and accessible via a user PIN (Personal Identification Number). Implementation of this technique requires additional hardware cost, because it demands the use of IC cards as well as card readers and other equipment such as card manufacturing equipment. Moreover, new cryptanalysis techniques to crack the private key inside the IC card have been discovered, including time analysis and fault analysis attacks.

In contrast, popular login processes, including those implemented in UNIX-like systems, use password and symmetric cryptography. One exemplary process is the following. The system station keeps an authentication database in which each legitimate user has registered identification data together with a hash digest of the user's password. At a user station, a user requests a login and enters his identification and password. The password entry is then run through the same hash function to produce a new hash digest. The resulting hash and the password entry are not sent to the accessed system. Instead, the accessed system creates a random message as a challenge, which is used to challenge the user station to prove that the new hash is produced from the valid password. The challenge is sent to the user station. The user station enciphers the received challenge with the new hash digest as the encryption key to produce a response. Next, the accessed system deciphers the received response with a decryption key, which is the stored hash digest associated with the claimed identity, to obtain a result. The user login succeeds if the result matches the challenge.

User authentication with password as described has been widely practiced despite several vulnerabilities. One threat to password safety arises from stealing passwords (and identifications) by Trojan horses. A Trojan horse is an intrusive programming code planted in a computer by attackers. The instructions of a Trojan horse are hidden and can do damage, while the intruded computer may appear to function normally. One type of Trojan horse can secretly record keyboard entries and then send the records to an outside computer, thereby stealing confidential information.

Passwords are also vulnerable to dictionary attacks. Among various forms of dictionary attacks that have been reported, the global dictionary attack is one that is hard to defeat. Attackers try a password guess globally, i.e. try every guess on all user accounts. Attackers can carry out an off-line global dictionary attack when the authentication database is available. Such an attack is very likely to succeed, because ordinary users often choose weak passwords easy to remember but can be included in a dictionary as high-prioritized guesses by an attacker. On-line global dictionary attacks are another form of dictionary attack, where the global guess is tried on-line. On-line attacks on one user account are often less likely to succeed if a throttling mechanism is built in the accessed system to restrict the number of attempts. But on-line global dictionary attacks may be able to bypass the throttling, because the guess attempts are globally applied to all accounts and not separately applied to one user account. As a further threat, on-line global dictionary attacks may cause the accessed system to deny services requested by legitimate users.

Another type of dictionary attack, called encryption dictionary attack, is described below. An eavesdropper may steal a pair of challenge and response messages. As defined, the response is computed by enciphering the challenge using the hash digest of a password entry as the encryption key. Consequently, this attacker can guess the password, off-line, by enciphering the challenge with hash(PWD) as the encryption key and comparing the cipher with the response, where PWD is a guess on the password. This type of dictionary attack is threatening.

Moreover, it is possible that attackers could build their own version of the login software that would accept a hash digest rather than a password entry as input. With this software, logins become easy when correct hash digests are available to the attackers.

Because user authentication with password may prevail for a long time, there exists a need to defeat these known attacks while allowing users to login with password as they are used to.

SUMMARY

The present invention describes, among others, exemplary methods, techniques, devices and systems for implementing digital user authentication based on asymmetric cryptography and two US patent application publications: US 20060083370 entitled "RSA with personalized secret" and US 20060036857 entitled "User authentication by linking randomly-generated secret with personalized secret".

The present invention refers to the two publications "RSA with personalized secret" and "User authentication by linking randomly-generated secret with personalized secret" as the first and second application publication respectively.

The methods and techniques described in the present invention may be incorporated in an authentication system utilizing a "challenge and response" process for secure communication between the user station and the accessed computer system.

It is assumed that a user requests an access to a system station from a user station. The system station is a computer system and is often referred to as a system or system site. The user station is a personal computer or device capable of computing cryptographic computations and communicating with other computing devices. The two terms "system side" and "user side" are also used.

One exemplary method uses two authenticators for authenticating a user to a computer system. One authenticator is a personalized secret such as a user-chosen password. The other is a crypto-key authenticator, which is produced by using a crypto-key generation process described in the first mentioned application publication. The two authenticators have a relationship: the crypto-key generation process uses the personalized secret and two odd primes as input to produce a trio consisting of a public module, a public exponent and a private-key-dependent exponent as the crypto-key authenticator. The user needs to present the two authenticators to get permission to access the computer system.

In one implementation, a user uses a first input and a second input to produce a digital signature in response to a challenge from a computer system to which the user requests an access. The digital signature is valid when the first and second inputs respectively match the first and second authenticators owned by the user. Based on this assertion, whether the digital signature is valid decides the match or mismatch and, accordingly, decides to authorize or reject the access request.

In this implementation, the computer system uses a public key to validate a received digital signature. In another implementation, the digital signature is also validated on the user side prior to including it into a response message. The public module and public exponent of the crypto-key trio form the public key available to the user side for the user-side validation. The same public key is also made available to the system side.

In one exemplary implementation, the user station receives the crypto-key authenticator in an automatic way; in other words, the user station is programmed to automatically retrieve a crypto-key trio from a persistent memory without explicitly receiving an instruction on this from the user. In the implementation, the user station is further programmed to receive a password input from the user for requesting an access to a system station, use the password input in producing a digital signature, while the system station is programmed to use a verifier to decide if the digital signature is valid, validate or invalidate the digital signature accordingly, decide that the password input matches a predetermined password if the digital signature is validated as being valid, and, as a result, authorize the access. In this implementation, the verifier is a public key and the user chooses the password independently. The choice of the password has no dependence on the information about the public key. Both the password and the public key are determined at the time of registration.

The user must be guaranteed that the system side uses a correct public key to validate a digital signature. The present invention further presents a business method to replace the conventional approach that uses a digital public-key certificate for ensuring the integrity of the public key. According to the business method, the user registers his public key with the system side and receives a registration confirmation. The registration confirmation states what the registered public key is and guarantees the user that the system side has an obligation to use this public key for digital signature validation. In case a dispute occurs, the user can use the registered public key on the registration confirmation to invalidate a digital signature falsely validated by the system side and accordingly resolves the dispute.

Furthermore, the present invention extends the function of the registration confirmation to include a guarantee to the system side: the user cannot deny the validity of a digital signature if the validity can be proven by a validation with the registered public key printed on the registration confirmation. In this extension, the registration confirmation becomes a legal agreement between the user and the system side.

In one implementation, the above business method is further complemented with a process for checking the public key in an on-line manner. The process ensures a user that a communicating computer system has the same public key as the one the user is using on the user side.

The present invention further describes exemplary methods, techniques, devices and systems for user authentication in a network having a plurality of systems.

In one exemplary method, a user chooses a password and uses this password and a collective authenticator for accessing all systems in a network. The collective authenticator comprises a plurality of member authenticators, each of which corresponds to one respective system in the network. In one implementation, each member authenticator is a record comprising a crypto-key trio, a user identifier of the user, and a system identifier of the corresponding system. Each crypto-key trio has a relationship with the chosen password. The aforementioned first application publication describes a crypto-key generation process to establish the relationship: using the password and a respective pair of two primes to produce three outputs as the crypto-key trio in each respective member record in the collective authenticator.

In the above exemplary method, the chosen password and the collective authenticator are two user authenticators. On the system side, the user is allowed to register different public keys with different systems in the plurality of systems. Thus, this exemplary method allows a user to use a password to access different systems in a network, and further allows each system in the network to use a respective public key in a digital signature validation for determining if the password is used.

The present invention also describes an article comprising a machine-readable medium that stores machine-readable instructions for user authentication based on asymmetric cryptography, the instructions causing a machine to: send an access request to a computer system; receive a challenge message from the computer system; use a first input, a second input, and the challenge message as input to a transformation to produce a digital signature; send the digital signature and a user identifier to the computer system; and receive an access decision from the computer system, wherein the access decision, either a permission or a denial, is determined at the computer system by using a registered public key associated with the user identifier.

In one implementation, the machine operating under the instructions as described above is a personal computer. The machine can be other user-side systems or devices such as a Personal Digital Assistant or a mobile phone with computing and communicating capabilities.

Some implementations function like a conventional password system from the user's perspective. There exists a technical difference. In the conventional system, a hash value of the password is stored for verifying the password input.

According to the present invention, validating a digital signature produced with the password input validates the password input.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

The above and other examples, implementations and their variations are now described in greater details in the attached drawings, the detailed descriptions, and the claims.

BRIEF DESCRIPTION OF THE DRAWINGS

The accompanying drawings are included to provide a further understanding of the present invention, and are incorporated in and constitute a part of the specification. In the drawings:

FIGS. 5-1 and 5-2 illustrate a modification on the update process shown in FIG. 4;

FIG. 6-1 is a flowchart illustrating an exemplary implementation of the challenge and response process illustrated in FIG. 1;

FIG. 6-2 is a flowchart illustrating one variation on one particular step in the flowchart of FIG. 6-1 when the user station employs a proactive processor and a reactive processor;

FIG. 7 illustrates an exemplary agreement on a user public key between a user and a system side for implementing a business method replacing the conventional approach that uses public-key certificates;

FIG. 10 is a flowchart illustrating an exemplary implementation utilizing the collective authenticator shown in FIG. 9.

DETAILED DESCRIPTIONS

Figure 1:
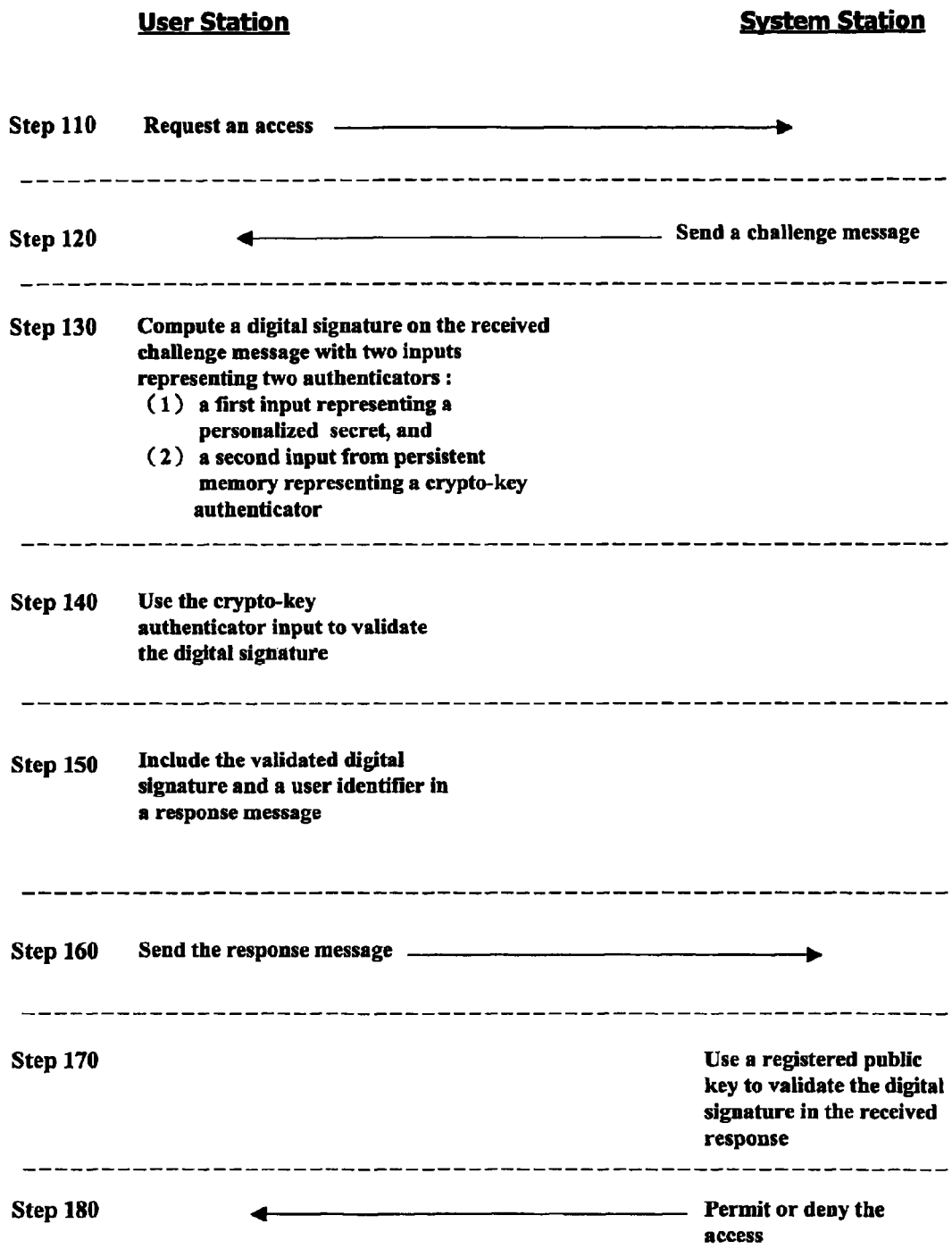
FIG. 1 illustrates a 'challenge and response' process utilized in the present invention for the communication between a user station and a system station, in which a user presents two authenticators on the user station to request an access to the system station while the system station uses a public key for verification.

Reference will now be made in detail to the preferred embodiments of the present invention, examples of which are illustrated in the accompanying drawings. Wherever possible, the same reference numbers are used in the drawings and the description to refer to the same or like parts.

User authentication described in the present invention is built on a challenge and response process for conducting the communications between the user station and the system station. This process is also called a protocol, for it defines a step-by-step manner guiding the communications between two stations. In the process, the user station uses two authenticators from a user to produce a digital signature in response to a challenge from the system station while the system station uses a registered public key associated with the user as a verifier to validate the digital signature.

Various implementations of the user authentication described in this invention disclosure have, among others, the following features. Firstly, the public key has a relationship with the two authenticators, but disclosure of the public key does not lead to a revelation of the secret information on the two authenticators. Secondly, the user is allowed to select, at his/her discretion, a personalized secret such as a user-chosen password as the first authenticator. Third, the user is allowed to change the two authenticators while keeping the registered public key unchanged. Fourth, the user is allowed to use one identical secret such as a password as the first authenticator while registering different public keys with different systems.

Refer to FIG. 1, which is a drawing illustrating the basics of this challenge and response process. In Step 110, a user station sends an access request to a system station. In Step 120, the system station sends a challenge message to the user station, challenging the user station to use two valid authenticators to prepare a response. In Step 130, the user station receives a first input representing a first authenticator and a second input representing a second authenticator and uses the two inputs to produce a digital signature on the challenge message. In Step 140, the user station uses the second input to validate the digital signature. Steps 130 and 140 can be repeated until a valid digital signature is produced. In Step 150, the user station includes the validated digital signature and a user identifier in a response message, In Step 160, the user station sends the response message to the system station. In Step 170, the system station uses a registered public key, identified according to the user identifier, as a verifier to validate the digital signature. In Step 180, the system station decides to permit or deny the access according to the validation result in Step 170 and notifies the user station the decision.

The first authenticator is a personalized secret such as a password. It is a selection at the discretion of the user. The second authenticator, also called a crypto-key authenticator, is a trio comprising a public module, a public exponent, and a private-key-dependent exponent.

Figure 2:
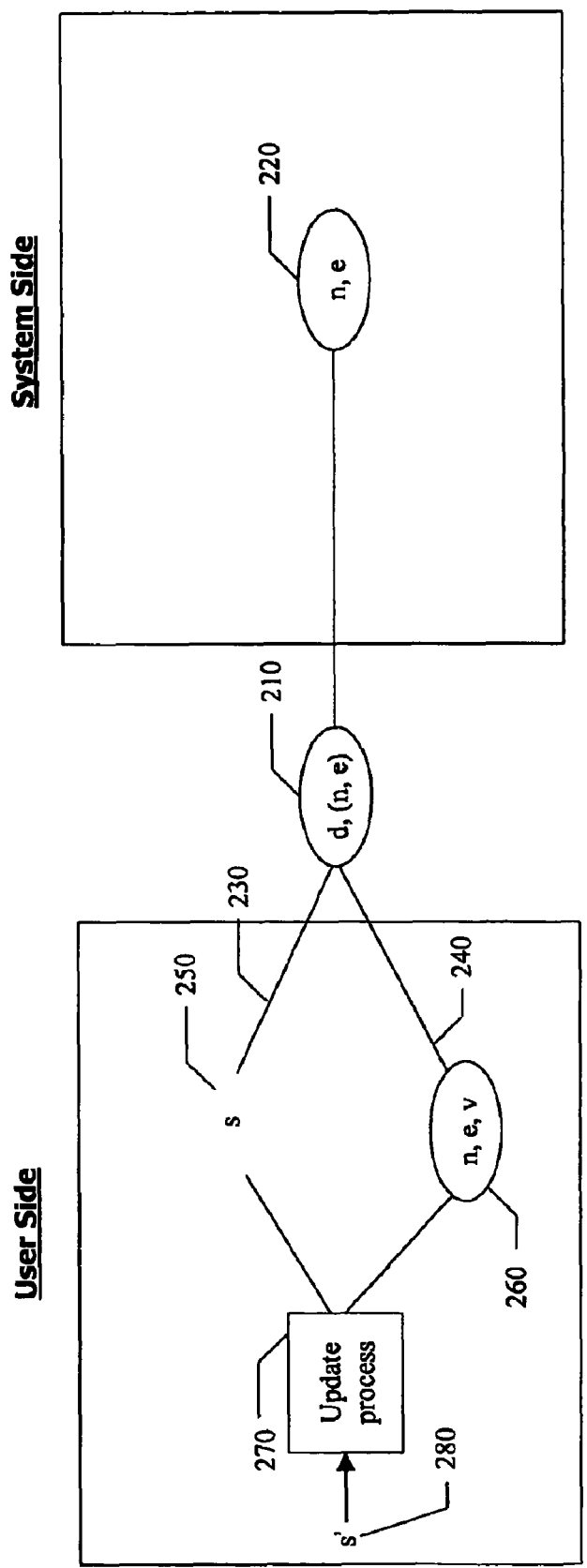
FIG. 2 schematically illustrates the linking role of a public/private key pair in connecting two authenticators on the user side to a verifier on the system side, and further schematically illustrates an update that allows the user to change the two authenticators on the user side while keeping the verifier on the system side unchanged.

Refer to FIG. 2. The conceptual framework as illustrated in this figure for the method described in the present invention resembles a conceptual framework described in the aforementioned second application publication "User authentication by linking randomly generated authentication secret with personalized secret". One major difference is that the method described in that publication is not based on asymmetric cryptography.

FIG. 2 schematically illustrates two essential concepts guiding the designs and implementations described in the present invention.

Firstly, a public/private key pair plays the linking role in connecting two authenticators on the user side to a verifier on the system side. The relationship between the public key and the private key of the key pair establishes the connection. On the system side, the verifier is the public key. On the user side, the two authenticators have another relationship with the key pair and substitute the key pair in producing and validating digital signatures. In FIG. 2, the element 210 in between the user and system side is a public/private key pair ((n, e), d) establishing the linking as described. The element 220 on the system side is a copy of the public key (n, e) and serves as a verifier. The lines 230 and 240 indicate that the two authenticators 250 and 260 replace the key pair. In the user authentication system described in the present invention, the private key d is destroyed upon the creation of the two authenticators and never recovered.

Secondly, the user is allowed to update the two authenticators while keeping the verifier on the system side unchanged. In FIG. 2, the update process 270 accepts a new first authenticator 280, expressed as s', and updates the two authenticators 250 and 260.

As described in more details in the following, these and other features provide a method of creating a password system for user authentication that is as secure as a RSA system but overcomes the inflexibility caused by the conventional RSA cryptography by allowing the user to select and change the password at his/her discretion.

Figure 3:
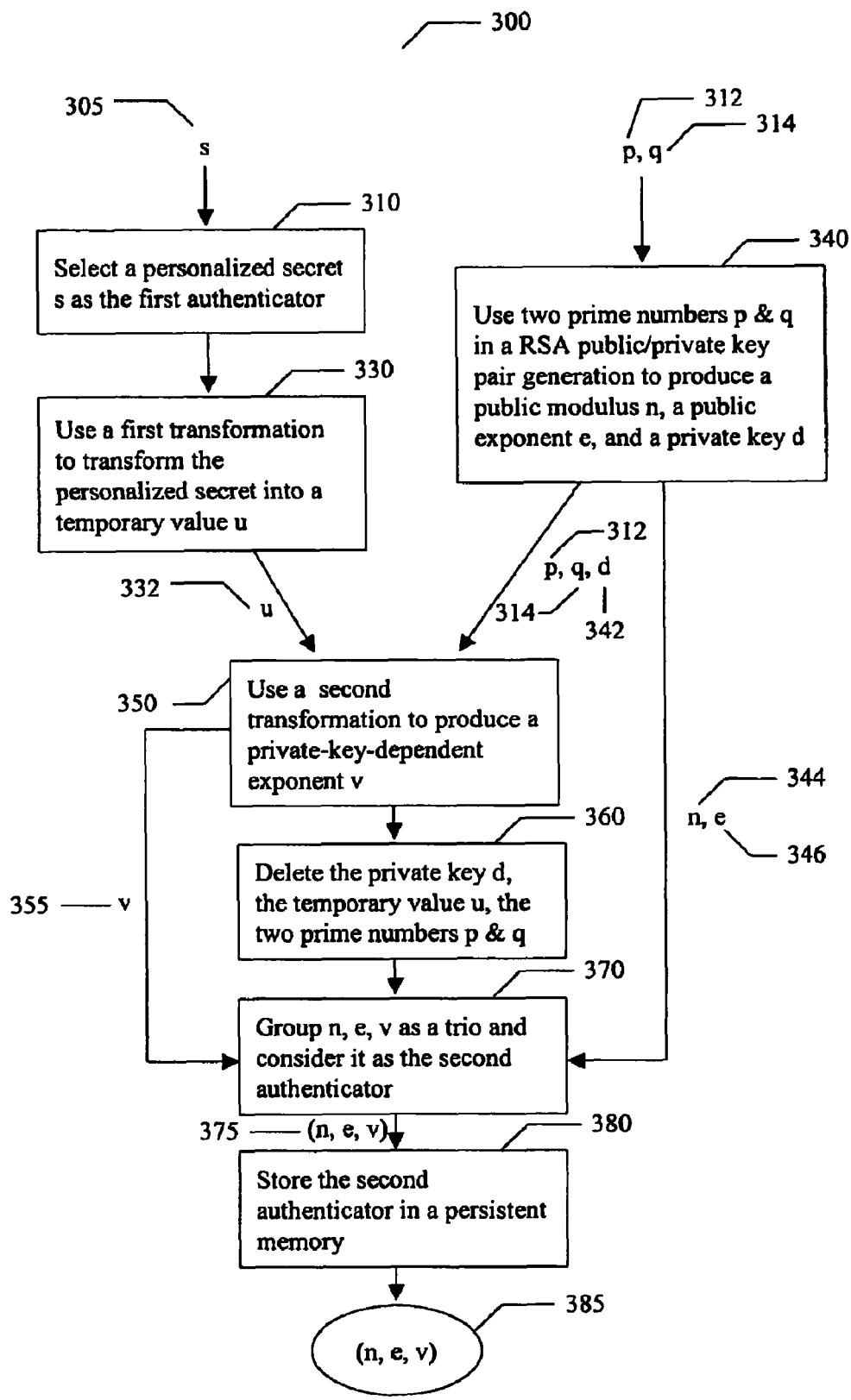
FIG. 3 illustrates a process adopted from the aforementioned first application publication for generating the two authenticators shown in FIGS. 1 and 2.

Now refer to FIG. 3, which illustrates a process for creating the two authenticators. This process 300 incorporates a crypto-key generation process described in the aforementioned first application publication, and is performed on a user station such as a personal computer or other personal computing devices capable of performing an RSA public/private key pair generation. The user station comprises a machine-readable medium that stores machine executable instructions. The instructions cause the user station to perform the following tasks. Step 310: receive a personalized secret 305, expressed as s. This secret 305 is considered as the first authenticator. Step 330: transform the personalized secret 305 into a temporary value 332, expressed as u, by a first transformation. Step 340: produce a public module n (344), a public exponent e (346) and a private key d (342) from two odd primes p (312) and q (314) by an RSA public/private key generation process. Step 350: use the temporary value u (332) from Step 330, the two primes p (312) and q (314) and the private key d (342) from Step 340 in a second transformation to produce a private-key-dependent exponent v (355). Step 360: delete the private key d (342), two primes p and q (312 and 314) and temporary value u (332) from the memory associated with the computation. Step 370: group the public module n (344) and public exponent e (346) from Step 340 and the private-key-dependent exponent v (355) from Step 350 into a crypto-key trio (n, e, v) (375). The trio (n, e, v) (375) is considered as the second authenticator. Step 380: store the second authenticator in a persistent memory 385.

According to FIG. 3, it is not required to use a persistent memory to store the first authenticator. The user may remember and input it by hand when needed. It is also not necessary to store its hash value or similar derivatives as a verifier in a persistent memory. In the user authentication as described in the present invention, validating a digital signature produced with a first authenticator input "indirectly" validates the input. This feature strengthens the security of the system, in particular, when the first authenticator is a user-chosen password.

The public module n and public exponent e in the crypto-key trio (n, e, v) in FIG. 3 form a public key. The user registers this public key as a verifier with a computer system. It can also be used as a verifier on the user side, as indicated in the process illustrated in FIG. 1.

In FIG. 3, Step 330 uses a first transformation while Step 350 uses a second transformation. The two transformations are considered as a pair, expressed as f1 and f2. Adopted from the aforementioned first application publication, one configuration of the transformation pair is the following:

$f1(x)=H(x);$ $f2(y, h, k, z)=c \times LCM(h-1, k-1)+z+((-y) \bmod LCM(h-1, k-1)).$ In the configuration, x, y, h, k, and z respectively denote a value instance of the first authenticator s (305), temporary value u (332), first prime p (312), second prime q (314) and private key d (342). In consideration that the two transformations are two mathematical functions, the input variables received by f1 and f2 are replaced with new symbols to avoid confusion.

The parameter c in the configuration of f2 is a non-negative integer. LCM stands for Least Common Multiple and H stands for a collision-resistant hash function. Also adopted from the aforementioned first application publication, a second configuration for the transformation pair f1 and f2 is:

f1(x)=H(x), where H and x are as defined; and f2(y, h, k, z)=c×f(h×k)+z+((−y) mod f(h×k)), where c is a non-negative integer, f is the Euler f function, and y, h, k, and z are as defined in the first configuration for f2.

Given f1, s, v, e, and n as defined and given M as a digital message, a digital signature on the digital message M is computed as signature(M)=hash(M)$^{f1(s)}$×hash(M)$^v$ mod n, which is equal to ((hash(M)$^{f1(s)}$ mod n)×(hash(M)$^v$ mod n)) mod n. Here the two modulo n exponential expressions, hash (M)$^{f1(s)}$ mod n and hash(M)$^v$ mod n, are used to compute two partial digital signatures on M. The tasks of computing the two partial digital signatures can be carried out on one single processor or on multiple collaborative processors.

To validate a given value, expressed as SGN, as a valid digital signature on M, the congruence equivalence is verified: hash(M)≡(SGN)$^e$ mod n.

The hash function in computing hash(M) above is no different from that adopted in the conventional RSA digital signature. The same hash function can also be used as the first transformation f1, but this is not a requirement for f1.

In the implementations for the process described in FIG. 1, digital signature computation is carried out on the user station, which may employ one single processor or multiple processors.

The first transformation is also made available to the user station. The second transformation is never used again after the creation of the two authenticators.

As described, the second authenticator is a crypto-key trio comprising a public module, a public exponent, and a private-key-dependent exponent. The public module and private-key-dependent exponent are used in digital signature computation while the public exponent is not. The public exponent is included in this authenticator for the purpose of performing digital signature validation on the user side. The user-side validation empowers the system side to detect a guessing attack at the beginning of the attack since the digital signature received from authorized users by the system side is always valid.

Figure 4:
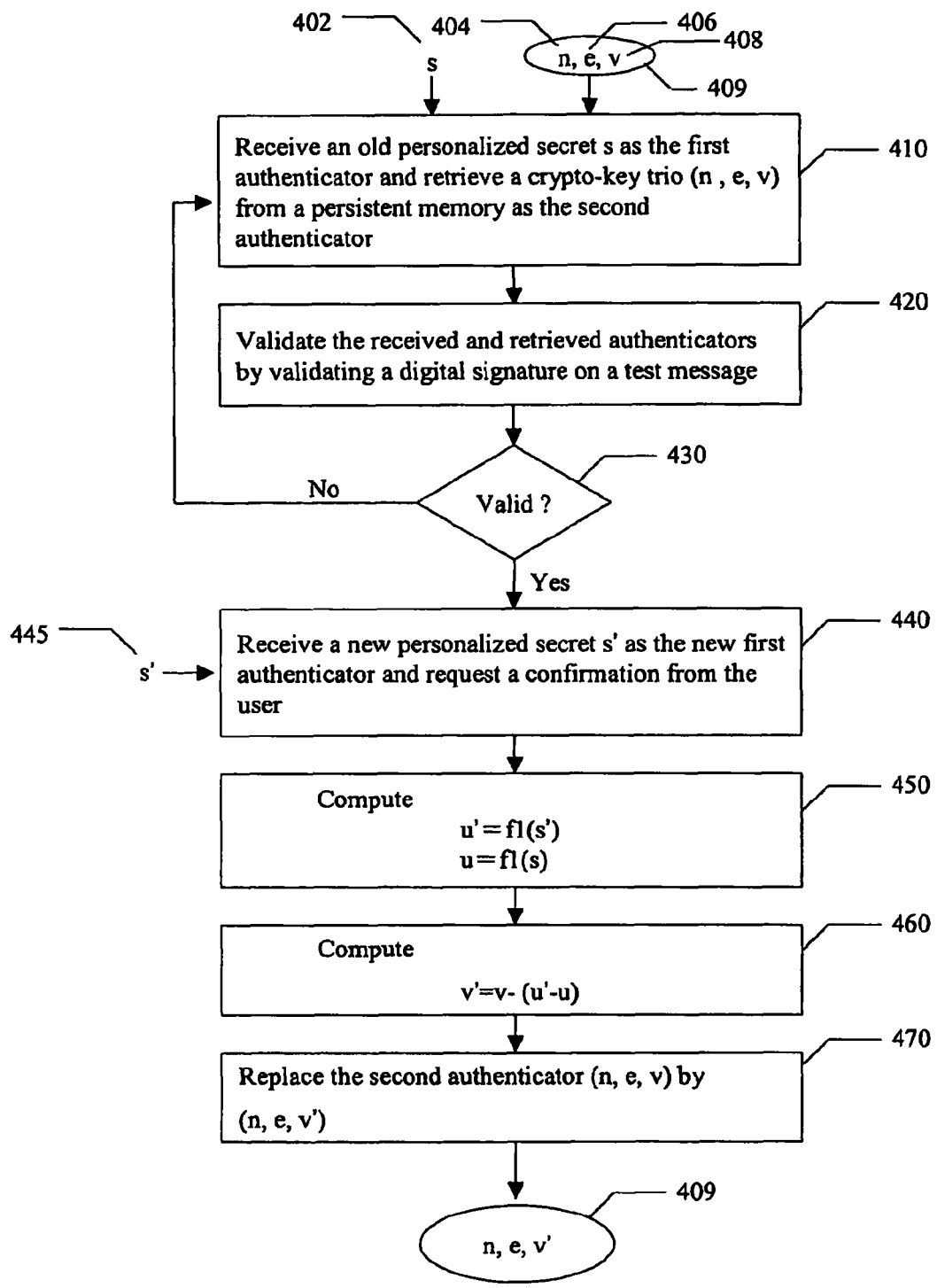
FIG. 4 illustrates a process also adopted from the first application publication for undating the two authenticators generated according to FIG. 3.

Now refer to FIG. 4. This figure illustrates a process implemented on a user station for updating the first and second authenticators. The user station performs the following tasks. Step 410: receive an old personalized secret 402, expressed as s, as the first authenticator and retrieve a crypto-key trio (n (404), e (406), v (408)) from a persistent memory 409 as the second authenticator. Step 420: validate the received and retrieved authenticators by validating a digital signature on a test message. The test message can be randomly generated. Step 430: proceed to the next step if the result of Step 420 is "valid"; otherwise repeat the input of Step 410 if desired. Step 440: receive a new personalized secret 445, expressed as s', as the new first authenticator and request a confirmation from the user. Step 450: compute two temporary values u=f1(s) and u'=f1(s') by the same first transformation in Step 330 of FIG. 3. Step 460: compute v'=v−(u'−u). Step 470: replace the second authenticator (n, e, v) by (n, e, v') and store it in the same persistent memory 409.

Notably, the above update process keeps the public module and public exponent unchanged. This process is done on the user station alone.

There appears one deficiency in the above update process to overcome. The result v' in Step 460 must be guaranteed as a positive integer. The term c×LCM(h−1, k−1) in the first configuration of f2 and the term c×f (h×k) in the second configuration of f2 are designed to overcome this deficiency. With an adequate positive integer c, the new private-key-dependent exponent v' so produced is guaranteed greater than the absolute value of the difference between f1(s') and f1(s), where the absolute value of the difference is the difference itself when the difference is positive and is the negative of the difference when the difference is non-positive. The guarantee is proven below. By the configuration f1(x)=H(x), the absolute value of the difference is certainly less than the maximum of $H(x_1)-H(x_2)$ for any two instances of $x_i$ and $x_2$. Given a selection for the function H, this maximum is a known constant. Therefore, we can set the parameter c to a positive integer such that c×LCM(p−1, q−1) or c×f(h×k) is greater than this maximum and such that subtracting the difference from the old private-key-dependent exponent v always yields a positive result.

Figures 1, 5:
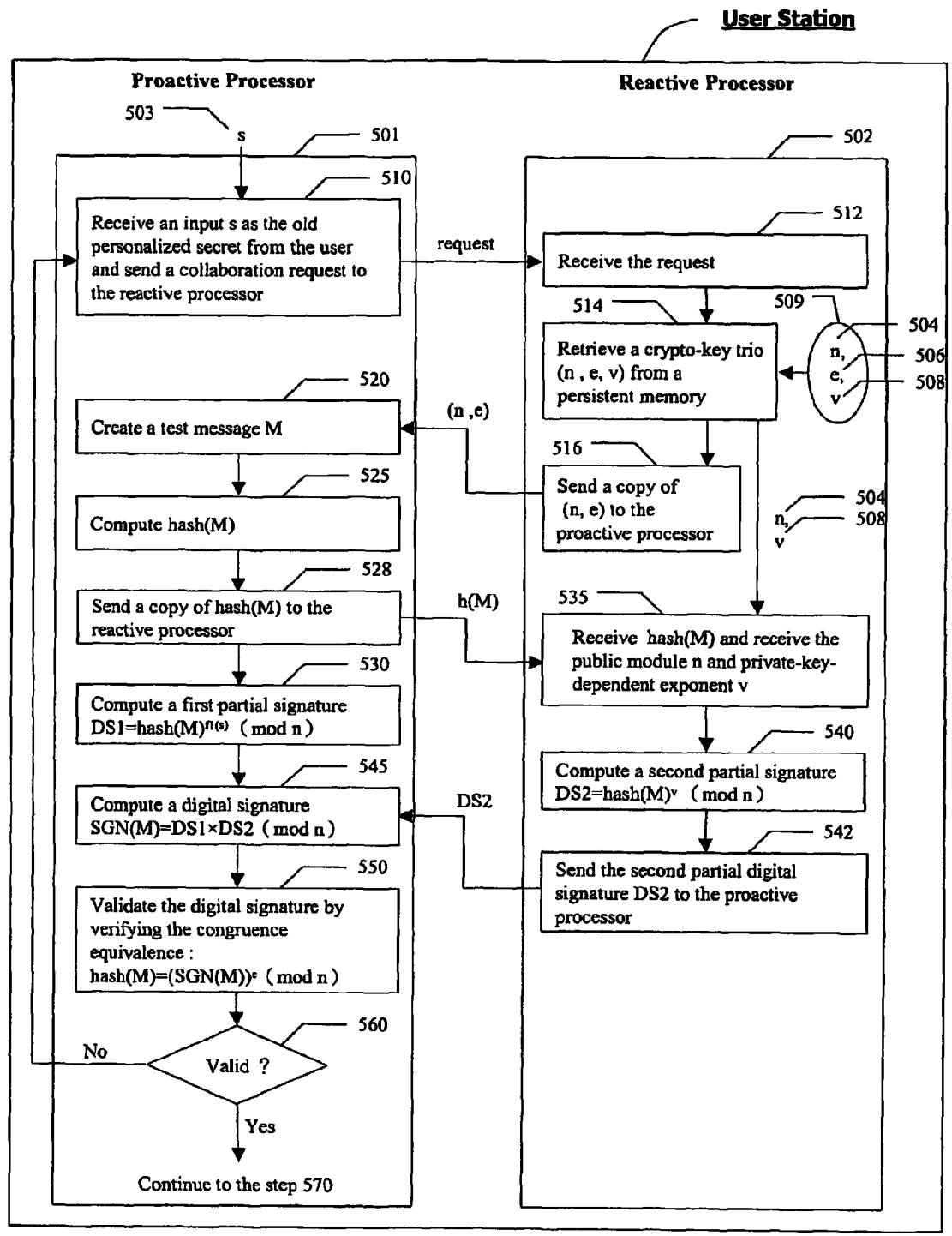
Figures 2, 5:
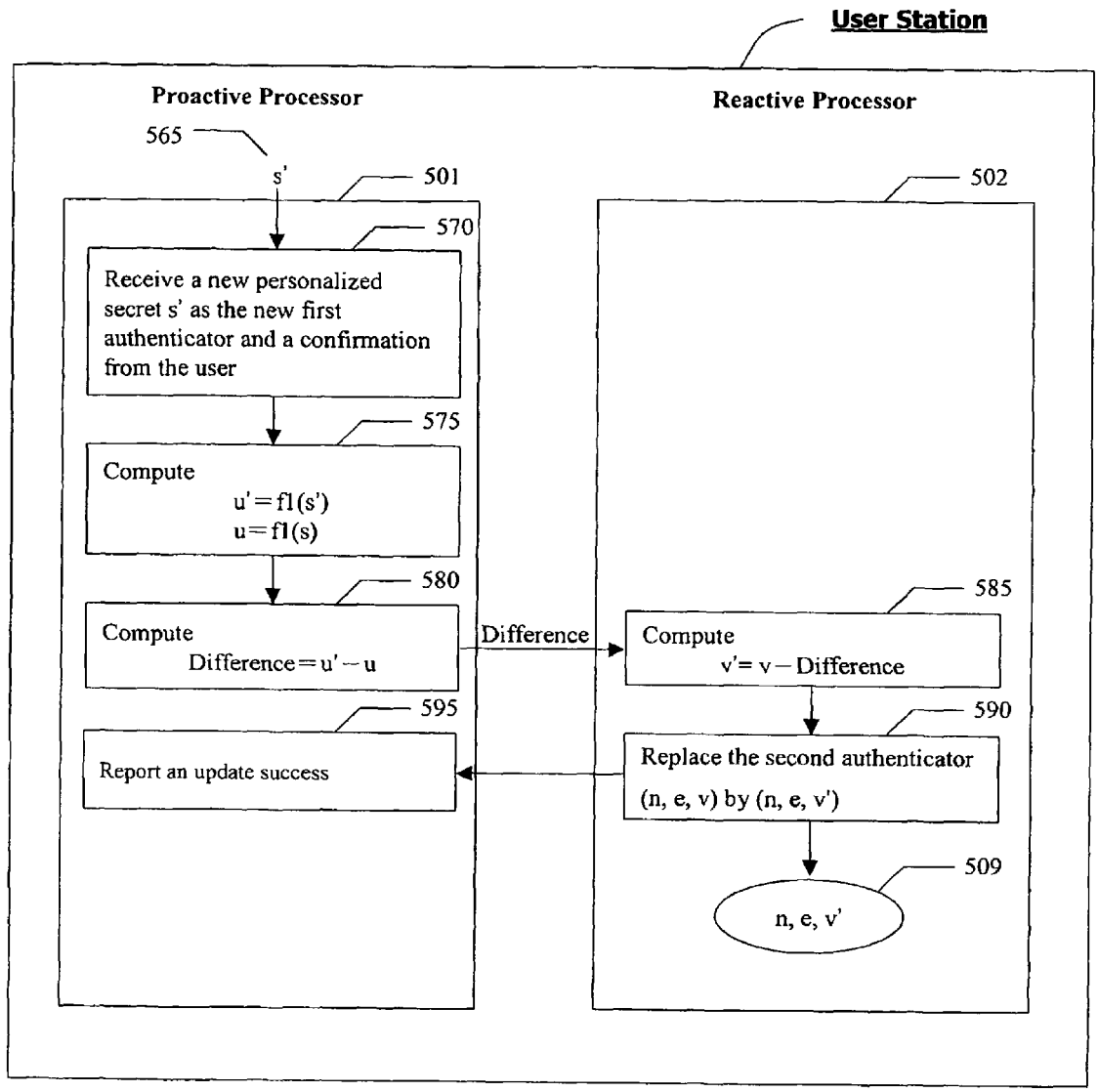

Refer to FIGS. 5-1 and 5-2, which illustrate a variation on the implementation of FIG. 4. In this variation, the user station where the update takes place employs a proactive processor and a reactive processor. It is assumed that the crypto-key trio (n, e, v) is stored in a persistent memory built in the reactive processor, and it is a purpose for designing this variation that the information on the private-key-dependent exponent v and its new value v' is kept inside the reactive processor.

As in FIG. 4, one part of the update is to validate the old first authenticator input. As shown in FIG. 5-1, performing this validation is more complicated in this variation with a proactive processor and a reactive processor. The two processors compute in collaboration a digital signature on a test message and then the proactive processor validates the digital signature so produced.

The details of FIG. 5-1 are described below. In Step 510, the proactive processor receives from the user an input s (503) as the old personalized secret and sends a collaboration request to the reactive processor for producing a digital signature. In Steps 512, 514, and 516, the reactive processor respectively receives the request, retrieves the trio (n (504), e (506), v (508)) from the persistent memory 509, and sends a copy of (n, e) to the proactive processor. In Steps 520, 525, 528, and 530, the proactive processor respectively creates a test message M, computes hash(M), sends a copy of hash(M) to the reactive processor, and produces a first partial digital signature on M by computing DS1≡hash(M)$^{f1(s)}$ mod n. In Step 535, the reactive processor receives hash(M) from the proactive processor and receives the public module n (504) and private-key-dependent exponent v (508) from Step 514. In Step 540, the reactive processor produces a second partial digital signature by computing DS2≡hash(M)$^v$ mod n. In Step 542, the reactive processor sends the second partial digital signature DS2 to the proactive processor. In Step 545, the proactive processor receives the first and second partial digital signatures DS1 and DS2 and computes a digital signature on M: SGN(M)≡DS1×DS2 mod n. In Step 550, the proactive processor validates the digital signature by verifying the congruence equivalence: hash(M)≡(SGN(M))$^e$ mod n. In Step 560, the proactive processor proceeds to perform the tasks shown in FIG. 5-2 beginning from Step 570 if the result in Step 550 is "valid", otherwise returns to Step 510 if desired.

The task illustrated in FIG. 5-2 performs an update on the crypto-key trio (n (504), e (506), v (508)). In Step 570, the proactive processor receives a new personalized secret s' (565) and a confirmation from the user. In Step 575, the proactive processor computes two temporary values u=f1(s) and u'=f1(s') using the same function as that in the first transformation f1 of Step 330 in FIG. 3. In Step 580, the proactive processor computes Difference=u'−u and sends it to the reactive processor. In Step 585, the reactive processor computes v'=v−Difference. In Step 590, the reactive processor updates the second authenticator by replacing (n, e, v) with (n, e, v'). In Step 595, the proactive processor receives a notice from the reactive processor and reports an update success to the user.

The term "private-key-dependent exponent" is used to emphasize that this crypto-key portion has dependence on the private key while the personalized secret has no dependence on the private key. Together the "personalized secret" and the "private-key-dependent exponent" replace the "private key". The private key itself becomes a "hidden" secret.

In both processes for generating and updating the authenticators, selection of the personalized secret is flexible. Such flexibility is due to that f1 is configured as a collision-resistant hash function. In the following, it is assumed that the personalized secret is a user-chosen password.

At the time of registration, the user applies the process illustrated in FIG. 3 to select a password as the first authenticator and produce a crypto-key trio (n, e, v) as the second authenticator. The user registers his/her identifier, the modulus n, and the public exponent e with the system station.

Figures 1, 6:
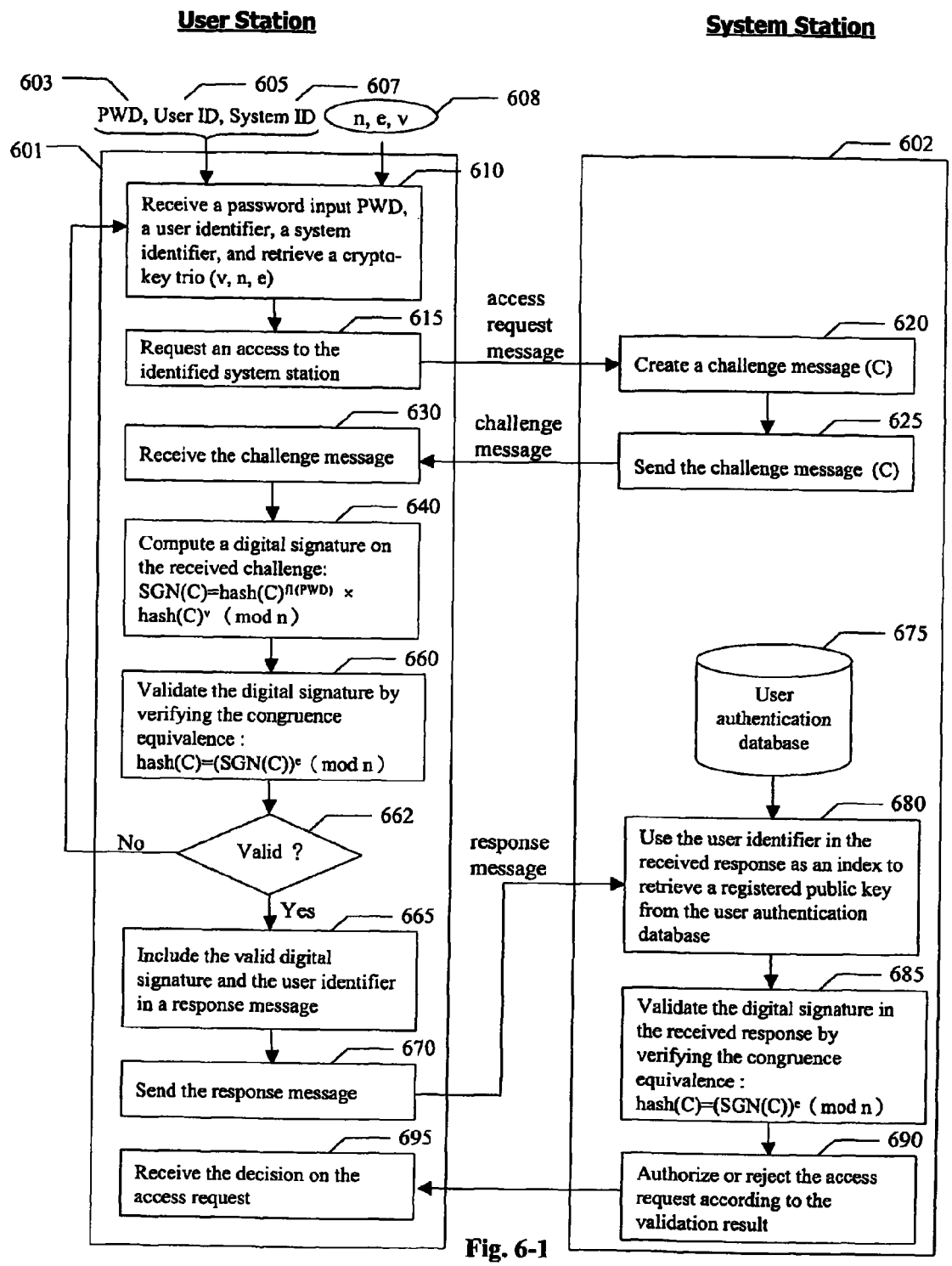
Figures 2, 6:
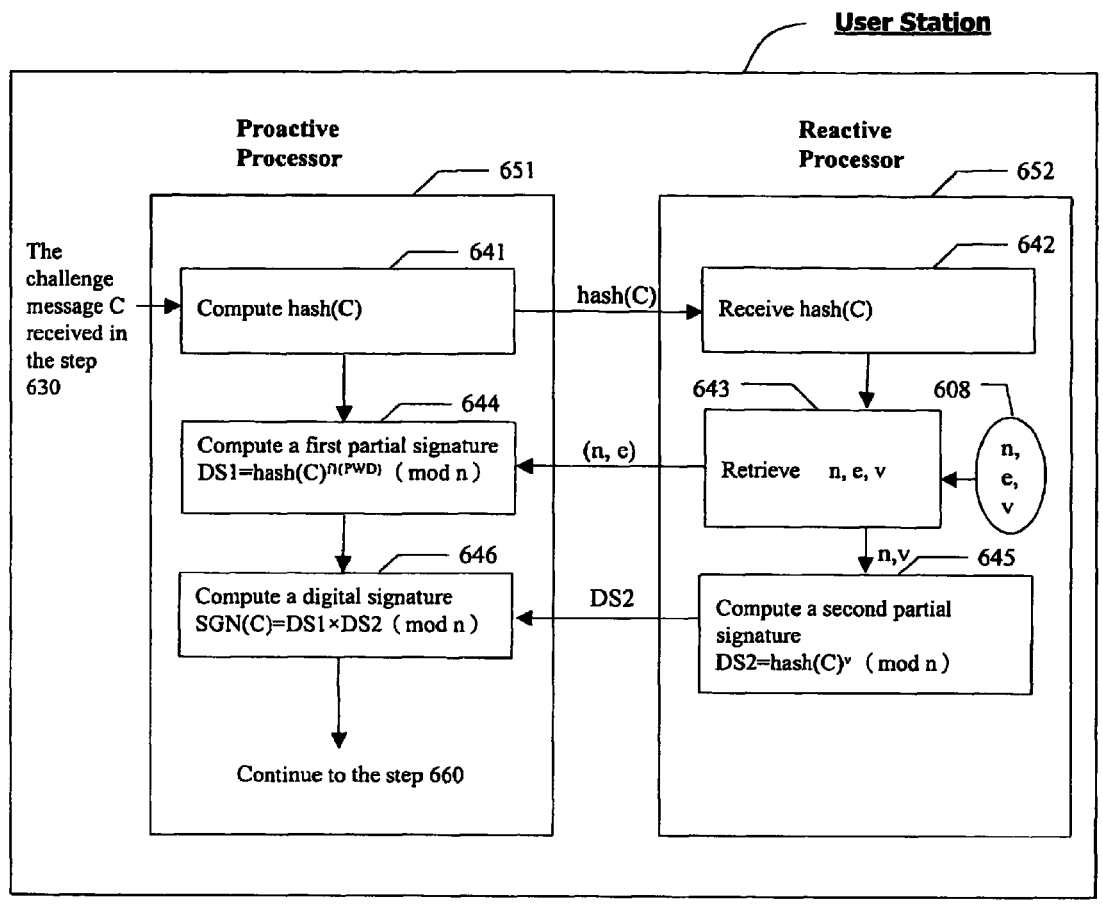

Now refer to FIG. 6-1 illustrating a flowchart for implementing the process shown in FIG. 1. The element 601 indicates a user station from which a user requests an access to a system station while the element 602 indicates the system station. In a network environment, a system identifier must be provided to identify the system station; also, a user identifier must be provided to identify the user. In Step 610, the user station receives a user identifier (605), a system identifier (607) and a password input PWD (603) from the user and retrieves a crypto-key trio (n, e, v) (608) from a persistent memory provided by the user. In Step 615, the user station sends an access request to a system station identified by the system identifier. In Step 620, the system station creates a challenge message C. The challenge message can be randomly generated. In Step 625, the system station sends the challenge message C to the user station. In Step 630, the user station receives the message C. In Step 640, the user station produces a digital signature on the received challenge message C by computing: SGN(C)≡hash(C)$^{f1(PWD)}$×hash(C)$^v$ mod n. In Step 660, the user station validates the digital signature by verifying the congruence equivalence: hash(C)≡((SGN(C)$^e$) mod n. In Step 662, if the validation result is "valid" then proceed to Step 665, otherwise repeat Step 610 if desired. In Step 665, the user station includes the valid digital signature and the user identifier (605) in a response message. In Step 670, the user station sends the response message to the system station. In Step 680, the system station retrieves a registered public key identified with the user identifier in the received response message from an authentication database 675. In Step 685, the system station validates the digital signature included in the received response by verifying the congruence equivalence: hash(C)≡((SGN(C)$^e$) mod n, where (n, e) is the registered public key, which is a copy of the public module n and the public exponent e of the crypto-key trio (n, e, v) (608). In Step 690, the system station authorizes or rejects the access request according to the validation result and notifies the user station. In Step 695, the user station receives the decision on the access request and proceeds accordingly.

In one implementation according to the flowchart illustrated in FIG. 6-1, the user station receives the crypto-key authenticator in an automatic way; in other words, the user station is programmed to automatically retrieve the crypto-key trio from persistent memory without explicitly receiving an instruction on this from the user. This implementation creates a password system resembling the conventional password system. From the user's perspective, a password method is evolved from the two-authenticator method as described. The password method comprises the following steps: receiving an input as a password when requesting a system access; using the input in producing a digital signature; using a public key in validating the digital signature; deciding that the input matches the password if the digital signature is validated as being valid, and, as a result, authorizing the access.

FIG. 6-2 illustrates one variation for Step 640 in FIG. 6-1. In this variation, the user station 601 employs a proactive processor 651 and a reactive processor 652 to carry out Step 640. The steps shown in FIG. 6-2 together replace Step 640. It is assumed that the trio (n, e, v) (608) is saved in a persistent memory that is built in as a part of the reactive processor. In Step 641, the proactive processor computes hash(C), where C is the challenge message received in Step 630, and then sends a copy of hash(C) to the reactive processor. In Step 642, the reactive processor receives hash(C). In Step 643, the reactive processor retrieves the trio (n, e, v) from its persistent memory and sends one copy of the public key (n, v) to the proactive processor. In Step 644, the proactive processor receives (n, e) and produces a first partial digital signature DS1 by computing DS1≡hash(C)$^{f1(PWD)}$ mod n. In Step 645, the reactive processor produces a second partial digital signature DS2 by computing DS2≡hash(C)$^v$ mod n and sends the result to the proactive processor. In Step 646, the proactive processor produces a digital signature on C by computing SGN(C)≡DS1×DS2 mod n and then proceeds to Step 660 of FIG. 6-1. All the steps shown in FIG. 6-1 except Step 640 are executed on the proactive processor. The two processors execute Step 640 in collaboration as described.

According to the implementations illustrated in FIGS. 6-1 and 6-2, a password input such as a password entry from the user is not validated against certain password's derivatives such as a hash digest of the password. Whether a password input matches the password is not determined until the result of Step 662 is known. If the result is 'invalid", either the password input or the provided crypto-key authenticator is false; the former is more likely, because the crypto-key authenticator is not human-entry data.

In the exemplary process as illustrated in FIG. 6-1, the crypto-key authenticator may be kept in a less costly storage device such as a memory card or a USB (Universal Serial Bus) storage device or an RFID tag.

The reactive processor 652 shown in FIG. 6-2 comprises built-in persistent memories to keep n, e, and v and is capable of computing partial digital signatures with v. The proactive processor leads the execution of the steps shown in FIG. 6-2. The reactive processor in this variation may be built into an IC (Integrated Circuit) crypto card. This crypto card has one advantage over the conventional IC crypto card that carries a public/private key pair. The secret inside the conventional card is the private key, which must be kept strictly confidential. Loss of such a crypto card causes a severe threat to the security. In contrast, the crypto card as the reactive processor illustrated in FIG. 6-2 keeps, besides the public key, the private-key-dependent exponent v, which is half of the secret, and loss of the half secret is much less of a concern.

The private-key-dependent exponent v has a dependence on the public key (n, e). However, disclosure of (n, e), either from the system side or from the user side, does not help successfully derive v if it is infeasible to derive the "hidden private key" d from (n, e). This is a consequence of the second transformation f2 as defined earlier.

Following is a discussion regarding the safety of the other half secret—the password. On the system side, the public key (n, e) is the verification information. Disclosure of the public key leaks no information about the password, because the user independently and discretionarily selects the password. The update process as devised allows the user to change the password and accordingly updates the private-key-dependent exponent on the user side while keeping the public key unchanged. The system station does not communicate with the user station during the update. Therefore, the system station gathers no information that can be used to help guess the password.

The system station and the user station communicate through a challenge and response scheme. The message in response to a challenge includes a digital signature on the challenge. The communication is secure so long as the "hidden private key" is secure.

On the user side, a password input is not validated against certain derivatives of the password. Each password input is "indirectly" validated via validating the produced digital signature. Accordingly, none of the password and its derivatives such as its hash digests or its ciphers is stored for input validations. In this context, derivatives of the password are an output of a transformation for which this password is the single input.

In a broader sense, the private-key-dependent exponent v is a derivative of the password. But v is a transformation by f2, which receives three inputs p, q, and d, in addition to the password: $v=f2(f1(\text{the password}), p, q, d)=c \times \text{LCM}(p-1, q-1)+d+((-f1(\text{the password})) \mod \text{LCM}(p-1, q-1))$ or $v=f2(f1(\text{the password}), p, q, d)=c \times f(n)+d+((-f1(\text{the password})) \mod f(n))$. Due to this derivation, disclosure of v leaves the password completely undetermined when the three secrets p, q, and d are unknown.

One option for cracking the password is by exhaustive search or dictionary attacks, i.e. by guessing. To determine the correctness of a guess, the attacker is forced to compute a digital signature and then verify whether it is valid; consequently, every guess demands modulo n exponential computations. Such a guess effort is much more time-consuming, as compared with a similar guess in the conventional password system.

Information security professionals continue to look for new solutions to user authentication, in part because the popular password scheme appears to be not secure enough for protecting against unauthorized accesses. Two-factor authentication offers a new direction. The method described in the present invention belongs to this class but with new features. Two-factor authentication often uses a user-chosen password as one authenticator along with one biological characteristic such as fingerprint as the other authenticator. Some people consider this type of two-factor authentication an infringement upon human privacy. Others use a physical token and a PIN (Personal Identification Number) as the two authenticators, respectively. In this type of approach, the PIN is not one half of the secrecy but a whole other secret used to access the "real" authentication secret such as a secret private key kept in the physical token. The method described in the present invention uses two halves of the secret private key. As described in the process illustrated in FIG. 3, the secret private key itself has been destroyed upon the generation of the crypto-key authenticator and never appears thereafter.

According to the implementation as described, the crypto-key authenticator is kept in a device. The first authenticator, i.e. the password, can be nonexistent in any device; its user remembers it. As described, neither a hash digest nor a cipher of the password must be kept in a persistent memory for input validation; instead, a password input is validated via validation of the produced digital signature. This unique combination of two authenticators distinguishes the present method from other two-factor authentication schemes.

Refer back to the challenge and response process between the system station and the user station as illustrated in FIGS. 1 and 6-1. There exist double validations on the digital signature: The user station validates the digital signature before including it in the response; on the other side, the system station validates the digital signature included in the received response. With this deliberate design, the system station is capable of distinguishing authorized accesses from intruders' attempts. Authorized users always respond to the challenge with a valid digital signature. To make this deliberate design more effective, one modification on the protocol is helpful. Included in the response message, the user identifier is also checked. Several ways for this modification are possible, including adding a check digit or a check code as a part of the user identifier or using a hash digest as the verification information. As a result, the system station is capable of detecting any form of on-line guess attack at the beginning of an attack.

The public key (n, e) is registered with the system station and is used by the system station to verify the response from the user station. It is the responsibility of the system side to ensure the integrity of the public key. Public-key certificates provide one conventional approach to satisfy this need. With this approach, the registered public key is one part of a certificate, which is certified by a trusted third party called a Certification Authority. In other words, the system side relies on the CA to ensure the integrity of the registered public key.

The user gains benefits from this conventional CA approach, since the system side and the CA both share the responsibility. Unless the system side colludes with the CA, it is detectable if the system side accepts false digital signatures. Therefore, the CA approach helps protect the user against misconduct by the system side.

Misconducts due to deficient security control on the system side are possible and indeed make up a major percentage among reported security failures. As described in the background section, technical deficiencies exist in the state-of-the-art password authentication systems; for example, system administrators or other insiders may steal user identifiers and the associated hash digests from the authentication database to access certain user accounts without authorization. Available techniques for illegal access include off-line dictionary attacks and attacks with special software accepting a hash digest rather than a password input.

Therefore, the user authentication described in the present invention strengthens the security when the integrity of the public key can be protected by the certification of CA.

Using the conventional CA approach to protect the integrity of the public key adds substantial complication. Information security professionals know this complication. With the password authentication method as described in the present invention, the complication is reduced. The reduction is a direct benefit of a security strengthened by secrecy separation. Losing either half of the secret is of much less concern than losing the whole secret. In case of a loss, the other half secret maintains an adequate security protection; therefore, the user may not need to request an immediate revocation of his/her certificate. Instead of reporting a loss to the CA, the user may request the system station to register a new public key and reject digital signatures that are valid according to the abandoned public key. Consequently, the complication caused by certificate revocation is substantially reduced.

The present invention also provides a business means to replace the role of CA. The business means is described below.

Registration of a public key with a system station by a user is an agreement between the system side and the user. Accepting the registration, the system station is responsible for accepting valid digital signatures and rejecting false digital signatures. One the other hand, the user cannot deny the validity of a valid digital signature if using the registered public key as the verifier in the validation proves the validity.

Thus, an agreement on the registered public key can be used as a means for the resolution of disputes. FIG. 7 illustrates an exemplary agreement on the public key signed by a user and a system side. According to the terms stated on the agreement, the user has the right to deny an invalid digital signature falsely accepted by the system side by proving the invalidity of the accepted digital signature with the public key stated on the agreement. Also, according to the terms stated on the agreement, the user has the obligation to accept the validity of a valid signature if using the public key on the agreement as a verifier proves the validity.

The registration agreement provides a means for resolving the dispute over the validity of a digital signature. Given the guarantee stated on the agreement, the user can trust the system side in using the correct public key; thus, using certificates as a means for checking the correctness of a public key becomes unnecessary.

The registration agreement scheme takes a new paradigm to ensure the integrity of the public key. It is a business method instead of a technical solution. It confirms a business convention that involvement of third parties is usually unnecessary for daily operations. The user trusts the system side to protect the integrity of the registered public key while keeping the registration agreement as a guarantee, which is needed only when there is a dispute to resolve.

This business method is applicable to asymmetric cryptosystems in general; it is not restricted to the RSA-based systems.

Figure 8:
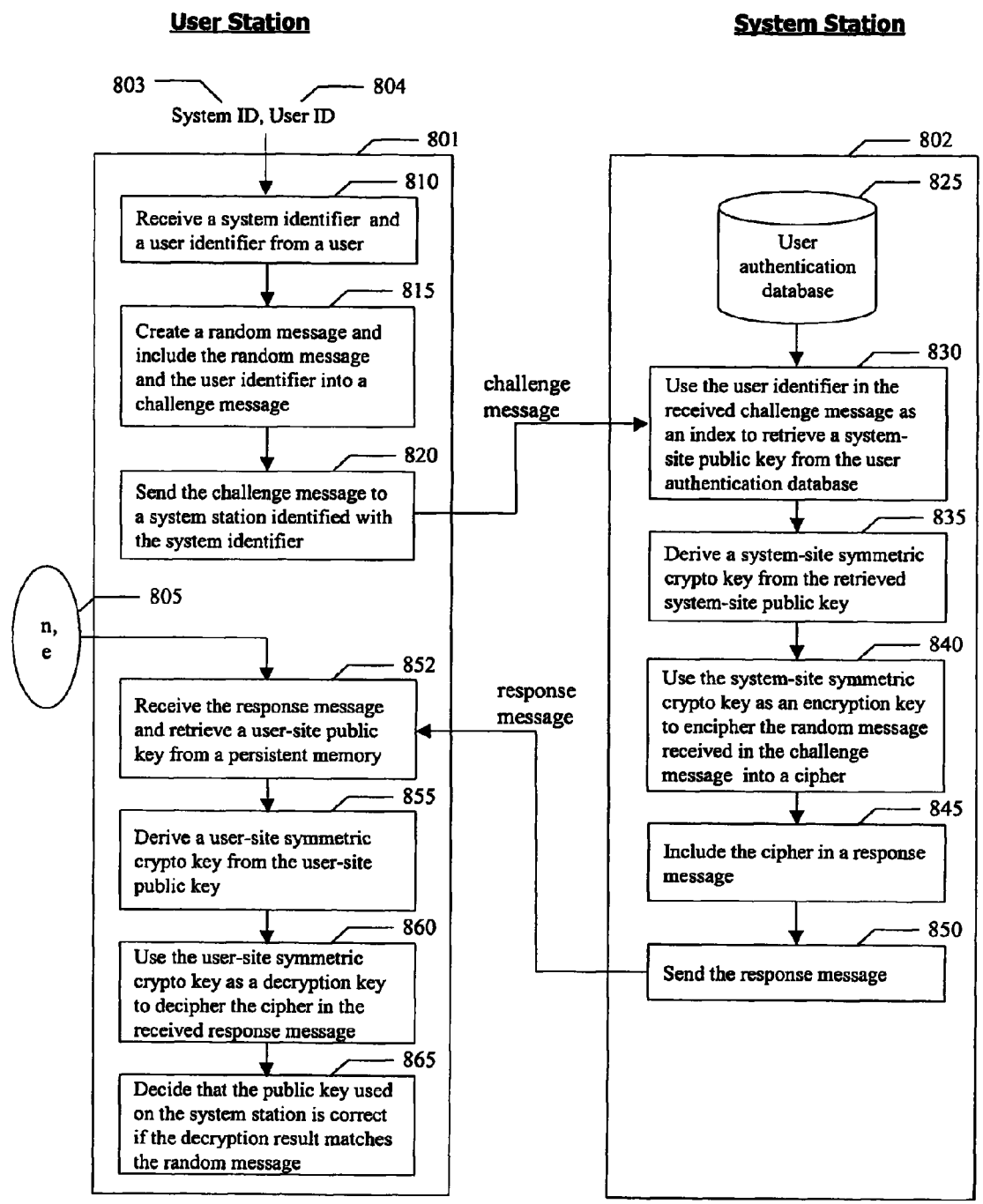
FIG. 8 illustrates an on-line public-key checking process complementing the public-key agreement shown in FIG. 7.

Refer to FIG. 8 which illustrates a process that allows a user to check whether a correct public key is available on a system station. The check is performed at the same time when the user requests an access to the system station. Therefore, this process may further convince the user to trust the system side, and can be considered as a complement to the method of using the public-key registration agreement.

This public-key on-line check process utilizes a challenge and response process based on symmetric cryptography. In Step 810, the user station receives a system identifier and a user identifier from a user. In Step 815, the user station randomly creates a message and includes the random message and the user identifier into a challenge message. In Step 820, the user station sends the challenge message to a system station identified with the system identifier. In Step 830, the system station uses the user identifier in the received challenge message as an index to retrieve a system-site public key from an authentication database. In 835, the system station derives a system-site symmetric crypto-key from the system-site public key. In Step 840, the system station uses the system-site symmetric crypto-key as an encryption key to encipher the random message received in the challenge message into a cipher. In Step 845, the system station includes the cipher in a response message. In Step 850, the system station sends the response message to the user station. In Step 852, the user station receives the response message and retrieves a user-site public key from a persistent memory. In Step 855, the user station derives a user-site symmetric crypto key from the user-site public key. In Step 860, the user station uses the user-site symmetric crypto key as a decryption key to decipher the cipher in the received response message. In Step 865, the user station decides that the system-site public key matches the user-site public key and, as a consequence, is correct if the decryption result matches the random message created in Step 815.

In the flowchart illustrated in FIG. 8, a first transformation is used to derive a system-site symmetric crypto-key in Step 835 while a second transformation is used to derive a user-site symmetric crypto-key in Step 855. The two transformations must be the same. A function that truncates a combination of the public module n and public exponent e serves the purpose here. Other types of function are possible.

The process of producing the two authenticators as illustrated in FIG. 3 allows the user to discretionarily choose the password. Therefore, the user may keep on using the same password even when a registered public key is replaced with a new public key.

Changing a registered public key is different from the update process illustrated in FIGS. 4 and 5, which always keeps the public key unchanged. Changing a registered public key needs to apply the process illustrated in FIG. 3 again. Certification of the new public key and revocation of the abandoned public key are required if a CA gets involved in protecting the integrity of the public key. As described, the role of CA can be completely removed using a registration agreement scheme The following assumes that the user needs to access a plurality of system stations in a network. It is a recommended security guideline that the user should choose different passwords for accessing different system stations. This guideline causes a memory burden for ordinary users. This guideline becomes unnecessary according to the present invention, because what is registered with a system station is a public key, which discloses no information on the password.

As discussed, the registration agreement scheme dispenses with a CA and greatly simplifies the complication of managing the public keys. This allows the user to register either a different public key with each accessed system station or one unique public key with several selected system stations. Such flexibility is enabled by two reasons: (1) the computational intractability of deriving the private key from the corresponding public key, and (2) the simplification of managing the public keys.

The user authentication with password as described in the present invention uses two authentication factors: (1) the password and (2) the crypto-key authenticator consisting of a public module, a public exponent, and a private-key-dependent exponent. The number of the crypto-key authenticators increases when the user registers different public keys with more system stations. This may at first glance appear as a drawback of having different public keys. But registering different public keys with different system stations results in a benefit: the risk caused by one particular "hidden private key" getting compromised is confined in the system with which the corresponding public key has been registered. Moreover, there are solutions, such as the one presented below, to overcome the drawback while giving the user the benefit of having a plurality of public keys.

In a network having a plurality of system stations, the user must provide the user station with an identification of the accessed system when requesting an access. The system identifier can be used as the index information to retrieve the crypto-key authenticator corresponding to the accessed system station. In other words, one crypto-key authenticator is associated with one system identifier. The associations can be collected in a single file so that the file and the password are the input to the user authentication process. The file as a collection of the associations simplifies the input. This file is called a collective authenticator.

A collective authenticator is a digital file held by its owner user. It can be kept in a device like a USB storage device, a memory card, an IC crypto card, or a cell phone. Carrying such a device and carrying the password in the mind, the user is able to roam around the network and access each of the systems with which the user is registered.

Figure 9:
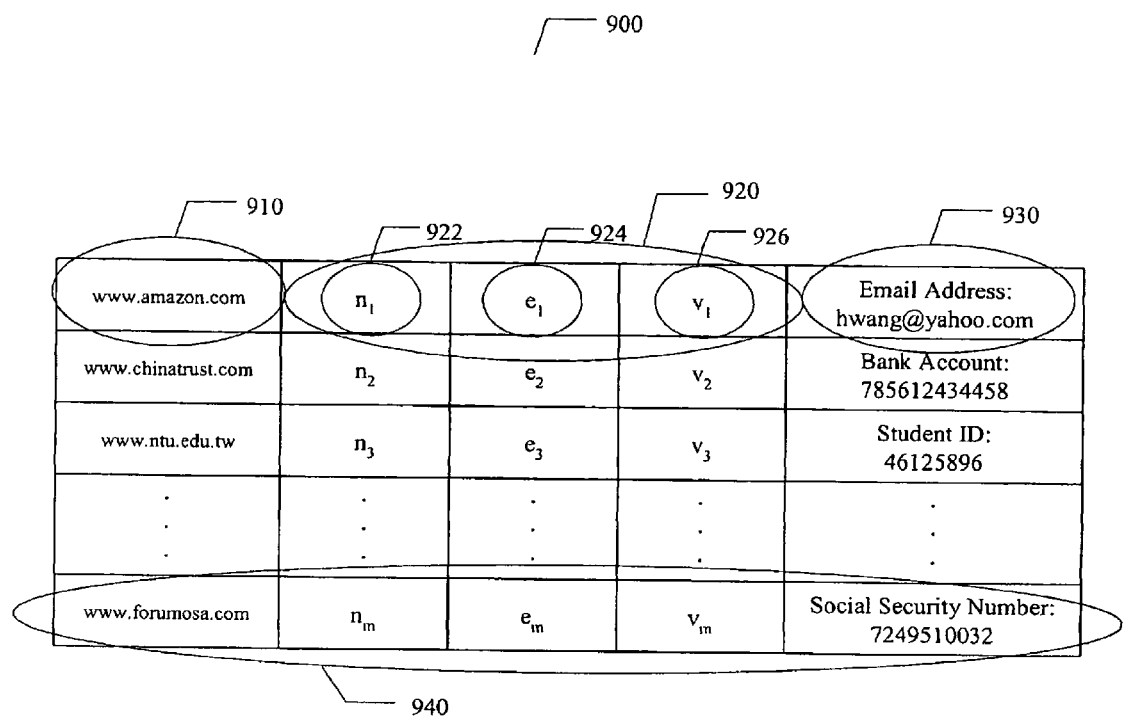
FIG. 9 is a diagram illustrating the components in an exemplary collective authenticator for user authentication in a network having a plurality of systems.

Refer to FIG. 9, which illustrates the components in an exemplary collective authenticator.

As shown in FIG. 9, a collective authenticator is a collection of member authenticators. Every member authenticator is composed of three items: (1) an identifier of an accessed system, (2) a crypto-key trio, also called a crypto-key authenticator, and (3) an identifier of the user. The crypto-key trio also has three components: (1) a public module, (2) a public exponent, and (3) a private-key-dependent exponent. Every member authenticator indicates that the user has registered one user identifier and one public key with one accessed system. In the collective authenticator, each user identifier is either unique or a duplicate; so is each public key. In this illustrated figure, the user registers an e-mail address, a bank account, a student ID, and a Social Security Number with different systems. The system identifier in each member authenticator uniquely identifies one system and is the index to retrieve a crypto-key trio and a user identifier from the collective authenticator.

In FIG. 9, the numbers 910, 920, and 930 respectively indicate a system identifier, a crypto-key trio, and a user identifier; while the number 940 indicates a member authenticator and the numbers 922, 924, and 926 respectively indicate a public module, a public exponent, and a private-key-dependent exponent.

The collective authenticator is a personal organizer for managing identification information and login data. No public-key certificates are required based on the registration agreement The user identifier and the corresponding public key registered with a system station are not bound together by a certified certificate.

All the features described above yield the flexibility and simplicity of managing the collective authenticator by its owner user, and enable safe and convenient access to system stations in a network having a plurality of system stations.

FIG. 10 illustrates one implementation for the user authentication in a network having a plurality of system stations as described. The flowchart in this figure is almost the same as that in FIG. 6-1. The difference is this: a collective authenticator (1008) is used in FIG. 10 while a single crypto-key authenticator (608) is used in FIG. 6-1. The details for FIG. 10 are given below.

The element 1001 indicates a user station from which a user requests an access to a system station while the element 1002 indicates the system station to be identified by the user. In Step 1010, the user station receives a user identifier (1005), a system identifier (1007), and a password input PWD (1003) from the user, and further receives a collective authenticator (1008) from a storage provided by the user. In Step 1012, the user station uses the system identifier as an index to retrieve a corresponding crypto-key trio from the collective authenticator. In Step 1015, the user station sends an access request to a system station identified with the system identifier. In Step 1020, the system station creates a challenge message C. The challenge message can be randomly generated. In Step 1025, the system station sends the challenge message C to the user station. In Step 1040, the user station receives the message C and produces a digital signature on the received challenge message C by computing: $SGN(C) \equiv hash(C)^{f^{-1}(PWD)} \times hash(C)^v \bmod n$. In Step 1060, the user station validates the digital signature by verifying the congruence equivalence: $hash(C) \equiv ((SGN(C)^e) \bmod n$. In Step 1062, if the validation result is "valid" then proceed to Step 1065, otherwise repeat Step 1010 if desired. In Step 1065, the user station includes the valid digital signature and the user identifier (1005) in a response message. In Step 1070, the user station sends the response message to the system station. In Step 1080, the system station retrieves a registered public key (n, e) identified with the user identifier in the received response message from an authentication database 1075. In Step 1085, the system station validates the digital signature included in the received response by verifying the congruence equivalence: $hash(C) \equiv ((SGN(C)^e) \bmod n$, where (n, e) is the registered public key. In Step 1090, the system station authorizes or rejects the access request according to the validation result and notifies the user station. In Step 1095, the user station receives the decision on the access request and proceeds accordingly. In this implementation, the registered public key obtained in Step 1080 at the system station is a duplicate of the public modulus n and the public exponent e of the crypto-key trio (n, e, v) obtained in Step 1012 at the user station.

In one further implementation according to the flowchart illustrated in FIG. 10, the collective authenticator is made accessible to the user station in an automatic manner, i.e. without the need of user interference. The difference between this implementation and a conventional password system may not be discernible to ordinary users. Nevertheless, the technical differences as described are substantial.

It will be apparent to those skilled in the art that various modifications and variations can be made to the present patent specification without departing from the scope or spirit. In view of the foregoing, it is intended that the present patent specification cover modifications and variations provided they fall within the scope of the specification and its equivalent.

What is claimed is:

1. A method for user authentication based on asymmetric cryptography, comprising:

providing a first input and a second input from a user who requests an access to a computer system;

authorizing the access by using a challenge and response process when the first input matches a personalized secret and the second input matches a crypto-key authenticator comprising a public modulus, a public exponent, and a private-key-dependent exponent;

changing the personalized secret to a new secret and updating the private-key-dependent exponent while keeping the public modulus and the public exponent unchanged;

using the personalized secret and two odd primes in a crypto-key generation process to produce the public modulus, public exponent, and private-key-dependent exponent; and registering said user's public key comprising said public modulus and said public exponent with said computer system, acceptance of which signifies an agreement between said user and said computer system in resolving dispute;

wherein the personalized secret comprises a user-chosen password, and the challenge and response process comprises using the first and second inputs to produce a digital signature in response to a challenge from the computer system by verifying the digital signature on both a user site and a system site.

2. A method for user authentication based on asymmetric cryptography comprising:
   receiving an input as a password when requesting a computer system access;
   using the input in producing a digital signature;
   using a public key in validating the digital signature, said public key being registered with said computer system, acceptance of which signifies an agreement between said user and said computer system in resolving dispute;
   changing the password while keeping the public key unchanged; using the password and two primes in a crypto-key generation process to produce the public key and a private-key-dependent exponent;
   using the input and the private-key-dependent exponent in producing the digital signature; and
      deciding that the input matches the password if the digital signature is validated as being valid and, as a result, authorizing the access.

3. A method for user authentication based on asymmetric cryptography comprising:
   authorizing an access request by validating a digital signature;
   using the public key on the registration agreement to resolve a dispute over the validity of a digital signature, acceptance of which signifies an agreement between said user and a computer system in resolving dispute;
   a process for checking whether a correct public key is available on a system station; and
   using a public key on a registration agreement to invalidate a digital signature falsely validated;
   wherein the checking process comprises:
      at a user station, sending a random message to the system station;
      at the system station, deriving a system-site symmetric crypto key from a system-site public key;
      at the system station, using the system-site symmetric crypto key as an encryption key to encipher the random message into a cipher;
      at the system station, sending the cipher to the user station;
      at the user station, deriving a user-site symmetric crypto key from a user-site public key;
      at the user station, using the user-site symmetric crypto key as a decryption key to decipher the cipher; and
      at the user station, deciding that the system-site public key matches the user-site public key and, as a consequence, is correct if the decryption result matches the random message.

4. A method for user authentication based on asymmetric cryptography in a network having a plurality of system stations comprising:
   allowing a user to use a password to access different system stations in the network;
   allowing each system station in the network to use a respective public key in a digital signature validation for determining if the password is used;
   registering said public key with said system stations, acceptance of which signifies an agreement between said user and said system station in resolving dispute;
   allowing the user to change the password while keeping the respective public key unchanged;
   using the password and a respective pair of two primes in a crypto-key generation process to produce the respective public key, and a respective private-key-dependent exponent;
   using the password and the respective private-key-dependent exponent in producing a digital signature;
   using the respective public key to validate the digital signature to authorize an access; and
   authorizing an access when the password is used.

* * * * *